Patented Aug. 15, 1944

2,355,676

UNITED STATES PATENT OFFICE 2,355,676

LYMPHOGRANULOMA VENEREUM ANTIGEN AND METHOD OF PREPARING IT

Geoffrey W. Rake, Kingston, and Morris F. Shaffer, New Brunswick, N. J., assignors to E. R. Squibb & Sons, New York, N. Y., a corporation of New York No Drawing. Application March 7, 1941, Serial No. 382,168

8 Claims. (Cl. 167—78)

This invention relates to antigens for lymphogranuloma venereum.

Antigens for the diagnosis of this disease by the cutaneous test have heretofore been obtained either (a) from human pus produced in those cases of suppurating bubo due to lymphogranuloma venereum in which no other venereal disease had coexisted and no secondary infection had supervened (Frei antigen), or (b) by propagation of the virus of lymphogranuloma venereum in mouse brain and preparation therefrom of a saline suspension of the killed virus. These antigens, however, were of low titer, and therefore unsuitable for the prophylaxis and therapy of lymphogranuloma venereum, as well as for diagnosis of this disease by the complement-fixation test. Antigens suitable for these purposes have heretofore been obtained only by propagating the virus in the yolk-sacs of developing fowl-embryos, as described and claimed in the Rake, Shaffer and McKee application Serial No. 358,428, filed September 26, 1940.

Caminopetros and Photakis (Bull. Soc. Path. Exot. 1935, 28, 81) asserted they had secured from the lungs of rabbits an antigen for the cutaneous test more sensitive than Frei antigen, but antigens prepared from this source by Von Haam and Hartwell (Jour. Trop. Med. and Hyg. 1937, 40, 214) proved to be valueless for diagnostic purposes.

It is the object of this invention to provide other highly-active lymphogranuloma-venereum antigens suitable for use in diagnosis (by both cutaneous and complement-fixation tests), prophylaxis, and therapy of this disease; and methods of preparing such antigens.

The antigens of this invention are essentially non-infectious (i. e., inactivated or virus-freed) preparations of mammal lungs which have been diseased with lymphogranuloma venereum. The methods of this invention essentially comprise inoculating mammal lung with a high-titer lymphogranuloma-venereum virus, propagating the virus therein, preparing a suspension of the lung material in a suitable aqueous medium, removing inactive material therefrom by differential centrifugation, and rendering the suspension non-infectious.

Thus, the antigens of this invention may be obtained by propagating a strain or strains of lymphogranuloma-venereum virus (of high titer) in the lungs of rodents for 2 to 5 days, preparing a suspension of the lung material in broth or physiological saline, separating the infectious material from gross lung-tissue fragments by centrifuging the suspension for 10–75 minutes at 2,000–3,000 R. P. M. (and discarding the sediment), and inactivating the infectious agent (e. g., by heat-sterilizing the suspension at 60° C. or treating with 0.1% formalin). Alternatively, the antigens may be prepared by removing the infectious agent from the suspension of lung material (preferably after centrifuging for 10–60 minutes at 2,000–3,000 R. P. M. and discarding the sediment), e. g., by centrifuging for 2 hours at 6,000–18,000 R. P. M. in the cold and filtering the suspension at either positive or negative pressure through a filter (or membrane) capable of retaining cultivatable bacteria, inter alia, Berkefeld candles, Chamberland candles, sintered-glass filters, collodion (e. g., Gradocol) membranes, and (preferably) Seitz EK pads.

The utilizable mammals include rats, monkeys, rabbits, guinea-pigs, and especially mice.

The virus used in the preparation of the antigens of this invention may be obtained from any suitable (high-titer) source, a mouse-lung-passage virus initiated with mouse-brain or yolk-sac material being preferred.

The following examples are illustrative of the invention:

Example 1

Four or six mice are inoculated intranasally, under light ether-anesthesia, with 0.03–0.05 cc. of a 1:10 dilution (in broth) of lungs harvested from mice infected by this route with lymphogranuloma-venereum virus.

After 2 to 3 days (or as soon as they are sick, moribund, or dead), the mice are opened, and the lungs removed, pooled, ground with abrasive, and made up to a 10% suspension with broth. The suspension is frozen at −32° F., thawed, and centrifuged 10–60 minutes at 2,000–3,000 R. P. M. in the cold (the sediment being discarded). Sufficient commercial formalin is then added to the supernatant to make a final dilution of 0.1% formalin; and phenol may be added to a final dilution of 0.25%. Two days later, the preparation is tested for bacterial sterility (in the usual manner), and for absence of active virus by inoculation into mice and the yolk-sac of developing chicken embryos. The resulting product is a highly-active lymphogranuloma-venereum antigen suitable for use in diagnosis (by both cutaneous and complement-fixation tests), prophylaxis, and therapy of this disease.

Alternatively, the suspension may be inactivated by heating for two hours at 60° C. on one day and for one hour at 60° C. the next day (instead of formalinizing).

Example 2

Five mice are inoculated intranasally, under light ether anesthesia, with 0.03 cc. of a 1:10 dilution (in broth) of lungs harvested from mice infected by this route with lymphogranuloma-venereum virus.

After 3 days (or as soon as they are sick, moribund or dead) the mice are opened, and the lugs removed, pooled, ground with abrasive, and the emulsion made up to a 10% suspension with broth. The suspension is centrifuged for 20–75 minutes at 2,000–2,500 R. P. M. in the cold, the sediment is discarded, and the supernatant is frozen overnight at −32° F. The following day the material is thawed and centrifuged for 15 minutes at 2,300 R. P. M. in the cold; the sediment is discarded, and the supernatant recentrifuged at 12,000 R. P. M. for 2 hours in the cold and passed through a Seitz EK filter pad under negative pressure. The resulting product is a highly-active lymphogranuloma venereum antigen suitable for use in diagnosis (by both cutaneous and complement-fixation tests), prophylaxis, and therapy of this disease.

The invention may be variously otherwise embodied within the scope of the appended claims.

We claim:

1. A lymphogranuloma venereum antigen obtained by inoculating mammal lung with a high-titer lymphogranuloma-venereum virus, propagating the virus therein, preparing a suspension of the lung material in a suitable aqueous medium, removing inactive material therefrom by different centrifugation, and rendering the suspension non-infectious.

2. A lymphogranuloma venereum antigen obtained by inoculating mouse lung with a high-titer lymphogranuloma-venereum virus, propagating the virus therein, preparing a suspension of the lung material in a suitable aqueous medium, removing inactive material therefrom by differential centrifugation, and rendering the suspension non-infectious.

3. A lymphogranuloma venereum antigen obtained by inoculating mammal lung with a high-titer lymphogranuloma-venerem virus, propagating the virus therein, preparing a suspension of the lung material in a suitable aqueous medium, removing inactive material therefrom by differential centrifugation, and inactivating the suspension.

4. A lymphogranuloma venereum antigen obtained by inoculating mammal lung with a high-titer lymphogranuloma-venereum virus, propagating the virus therein, preparing a suspension of the lung material in a suitable aqueous medium, removing inactive material therefrom by differential centrifugation, and rendering the suspension virus-free.

5. The method of preparing a lymphogranuloma-venereum antigen which essentially comprises inoculating mammal lung with a high-titer lymphogranuloma-venereum virus, propagating the virus therein, preparing a suspension of the lung material in a suitable aqueous medium, removing inactive material therefrom by differential centrifugation, and rendering the suspension non-infectious.

6. The method of preparing a lymphogranuloma-venereum antigen which essentially comprises inoculating mouse lung with a high-titer lymphogranuloma-venereum virus, propagating the virus therein for 2 to 5 days, preparing a suspension of the lung material in a suitable aqueous medium, separating the infectious material from gross lung-tissue fragments by centrifuging for 10–75 minutes at 2,000–3,000 R. P. M. and discarding the sediment, and rendering the suspension non-infectious.

7. The method of preparing a lymphogranuloma-venereum antigen which essentially comprises inoculating mouse lung with a high-titer lymphogranuloma-venereum virus, propagating the virus therein for 2 to 5 days, preparing a suspension of the lung material in a suitable aqueous medium, removing inactive material therefrom by differential centrifugation, and formalinizing the suspension.

8. The method of preparing a lymphogranuloma venereum antigen which essentially comprises inoculating mouse lung with a high-titer lymphogranuloma-venereum virus, propagating the virus therein for 2 to 5 days, preparing a suspension of the lung material in a suitable aqueous medium, removing inactive material therefrom by differential centrifugation, and filtering the suspension through a filter capable of retaining cultivatable bacteria.

GEOFFREY W. RAKE.
MORRIS F. SHAFFER.